United States Patent [19]

De Candia

[11] 4,162,387
[45] Jul. 24, 1979

[54] CAR BODY WELDING ASSEMBLY SYSTEM

[76] Inventor: Ettore De Canida, 78240 Chambourcy, Montaigu, France

[21] Appl. No.: 803,960

[22] Filed: Jun. 6, 1977

[51] Int. Cl.² .............................................. B23K 09/12
[52] U.S. Cl. ....................................... 219/79; 219/80; 219/86.24; 219/158; 219/161
[58] Field of Search ............... 219/79, 80, 86.24, 86.7, 219/158, 161

[56] References Cited

U.S. PATENT DOCUMENTS

| | | | |
|---|---|---|---|
| 2,215,693 | 9/1940 | Fleming | 219/86.24 X |
| 3,288,978 | 11/1966 | Trygar | 219/80 |
| 3,654,616 | 4/1972 | Dunne | 219/79 X |
| 3,744,032 | 7/1973 | Engelberger | 219/80 X |

Primary Examiner—Richard R. Kucia
Attorney, Agent, or Firm—Lloyd M. Forster

[57] ABSTRACT

A body assembly system for welding different stamped sheet metal vehicle bodies at successive framing and finish welding stations including means for accurately locating different underbody, side and top components in required accurate geometric relation at a framing station with programmable welding means for producing different initial retention welds at the framing station as well as finishing welds at successive "respot" welding stations as required for the different bodies. The system includes means for rapidly positioning locating tooling for body components at the framing station as required for different bodies as well as means to minimize and facilitate change of special tooling for model changeover.

20 Claims, 9 Drawing Figures

CAR BODY WELDING ASSEMBLY SYSTEM

PRIOR FOREIGN APPLICATION

This application is based in part on a prior application filed in Italy on Mar. 14, 1977 having Ser. No. 67563-A/77.

BACKGROUND OF THE INVENTION

In the United States most automotive vehicle bodies are manually welded on continuous flow carrousel gate lines. Different loosely assembled bodies may be pre-scheduled to move through the line on pallets or trucks with matching side locating "framing" gates, manual welding being employed as required for whatever body is moving on the line.

Some body assembly plants employ framing bucks which hold all main components—underbody, sides and top—in proper relation in a single special fixture, with manual welding likewise employed to accommodate different welding requirements for any particular body. In some cases automatic multiple spot welders are mounted on a framing head with pivoting pillars; however, in such cases the weld locations are fixed for each particular body with no provision for programming welding heads for different bodies.

In one case for a particular car model having three body styles, programmable robots were provided for respot or finish welding at successive fixed stations. Provision was made for initial framing of the main components in a first carrousel section where trucks carrying the underbody move continuously along with matching framing side gates for the individual body styles, the welding being performed partially by hand and partially by automatic welding heads limited to common weld spots for all three body styles with the continuous flow trucks returning to starting position at the end of each weld cycle. Hand welding was employed for any spots which differed for the various body styles. The robot welding programmed for automatic change for the different body styles all takes place in the second section after the body geometry is fixed in the first continuous flow carrousel framing station. Following the intermittent flow through the second robot section provision was made for the trucks to resume continuous flow through a third section where finish respot welding was manually performed.

In the case of automatic lines the transfer system is always a rigid system, which requires fixed steps from each welding station to the next one and a necessary route of the parts with a preset and constant speed of the transfer.

The disadvantage of this known system consists specifically in its rigidity, which makes extremely difficult and expensive the possible introduction or elimination of supplementary or intermediate operations and makes it necessary to rebuild all tooling for the production of a new model of car which must go through the same line.

SUMMARY OF THE INVENTION

The present invention is directed to provide an improved system of assembly by welding, which overcomes many of the above mentioned known systems, limitations and inconveniences; also to increase the flexibility at reduced cost for automatically welding different vehicle bodies in random progression on the same line; and to substantially reduce the cost of changeover retooling for new body styles. In order to realize the above mentioned purposes, the present invention comprehends a system for the assembly by welding of bodies for vehicles and similar structures comprising stamped sheet metal elements, characterized by the combination of: (a) a plurality of holding carrier pallets, each provided with reference and clamping devices, which are able to match with the lower surface of a preassembled body in white, to provisionally connect the stamped sheet metal elements which compose it, and to clamp this preassembled body on the pallet in a pre-established position; (b) one or more "framing" welding stations each having in addition to programmable welding devices interchangeable holding side frames hereafter called "side gates" able to engage a preassembled body supported by a pallet, to give this body the exact final geometry; (optionally interchangeable locators, as for "two-door" and "four-door" models, may be incorporated on a given side gate); and (c) supporting and transferring devices able to support with a stable bearing the pallets and to obtain their displacement along a route passng through the welding stations.

Following this invention, the supporting and transferring devices for the pallets can be made either by self-contained motorized transferring units, by a step-by-step transfer line, or by a non-synchronous transfer line.

Following another object of this invention, a framing station is able to receive at least two different types of "side gates" each of which is equipped to operate on one type of body in white different from those for which the other types of "side gates" are equipped; devices are provided to displace to their operative position the needed type of "side gates," the others being in a waiting position.

The welding devices of each station are mainly constituted by robots having different programs chosen each time by a programmable controller according to the type of body to be welded.

Thus, the system comprehends intermittent transfer of different bodies to individual fixed stations, of rigid pallets for accurately mounting the underbody mounted on self-propelled trucks or moved in shuttle system or by a continuous conveyor with means for disengagement of the pallet drive at the respective fixed stations. Side gates provided at a given framing station may be interchangeable with other side gates or otherwise adapted to accommodate different bodies with provision for programmed welding to meet the requirements of each different body as by "robot" welding units. Reciprocable rapidly interchangeable gates may be provided where required to accommodate the side components of different bodies and alternate framing station may be employed to accommodate as many different bodies as the manufacturer wishes to assemble in a single system.

The system of the present application differs from any of the aforementioned known prior systems in a number of respects. All hand welding is eliminated and all automatic welding is performed at fixed stations eliminating any need for welding heads to move with a continuous flow line. In the preferred embodiment different bodies are accommodated at the same framing station through the provision of rapidly interchangeable side gates with programmable welding units adapted for automatic change to the different welding requirements of each of the bodies. Optionally, a given gate may be equipped with automatically interchangeable locators which may be adapted for different bodies such as "two-door" and "four-door" models otherwise generally similar in total body configuration. Provision is made for accommodating different underbody pallets where required for different bodies and complete flexibility may be achieved to ultimately handle any number of car body models and styles in any mixed order within a single system having all welding operations automatically performed.

Further flexibility and economy of changeover to new models is provided by minimizing the special tooling required for locating specific body components in the side gates and on the pallets which, together with the flexibility of the reprogrammable welding units, drastically reduce the expense of model changeover.

Thus, the advantages of the invention principally consist in the fact that it provides an automatic body assembly line, programmable with the possibility to automatically vary the program according to each type of body to be assembled; provides for varying at any moment the proportion of the production rate of one type of body in white respectively to another type; and permits retooling for a new type of body in a very short period and with minimized investment costs.

Figure 1:
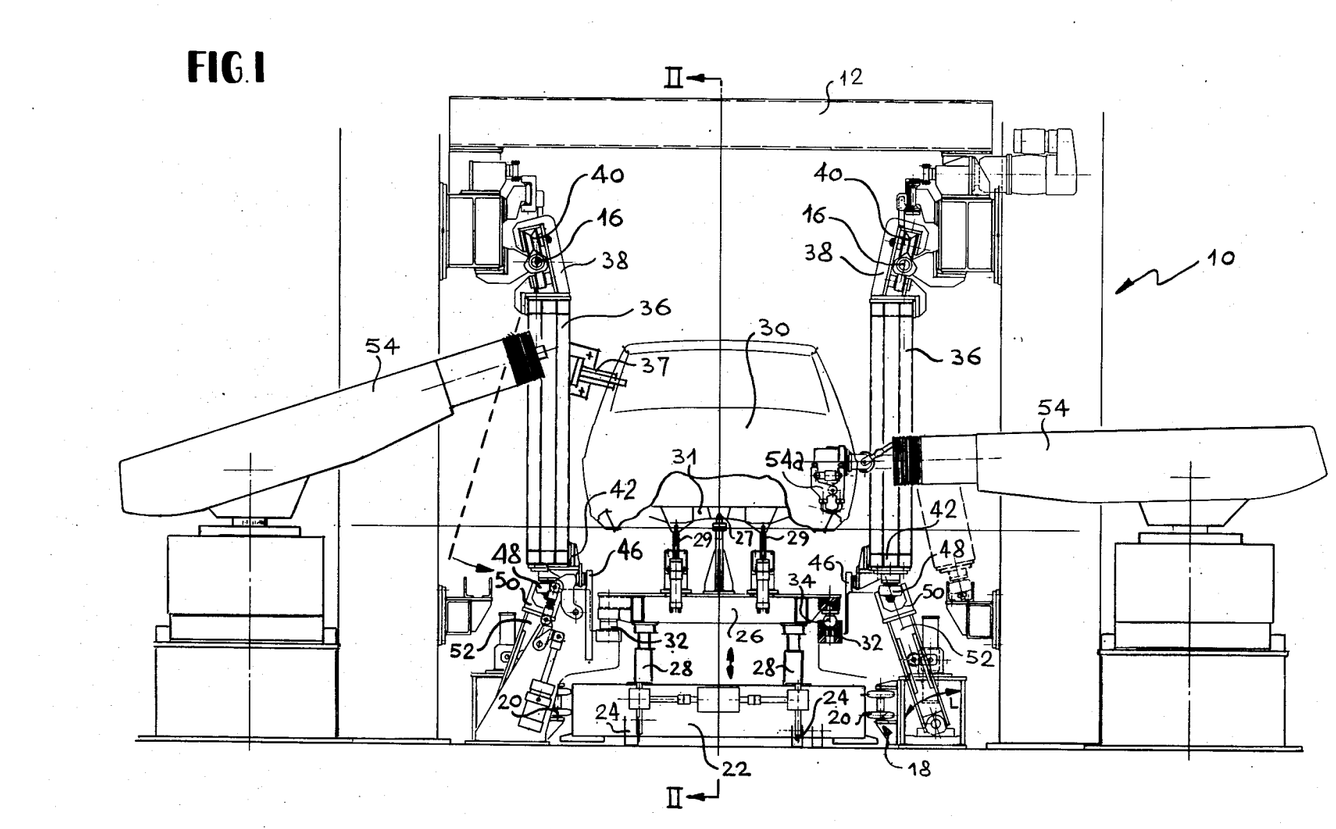
FIG. 1 is a front view, partially sectioned, of a "framing" welding station constructed in accordance with the present invention.
Figure 2:
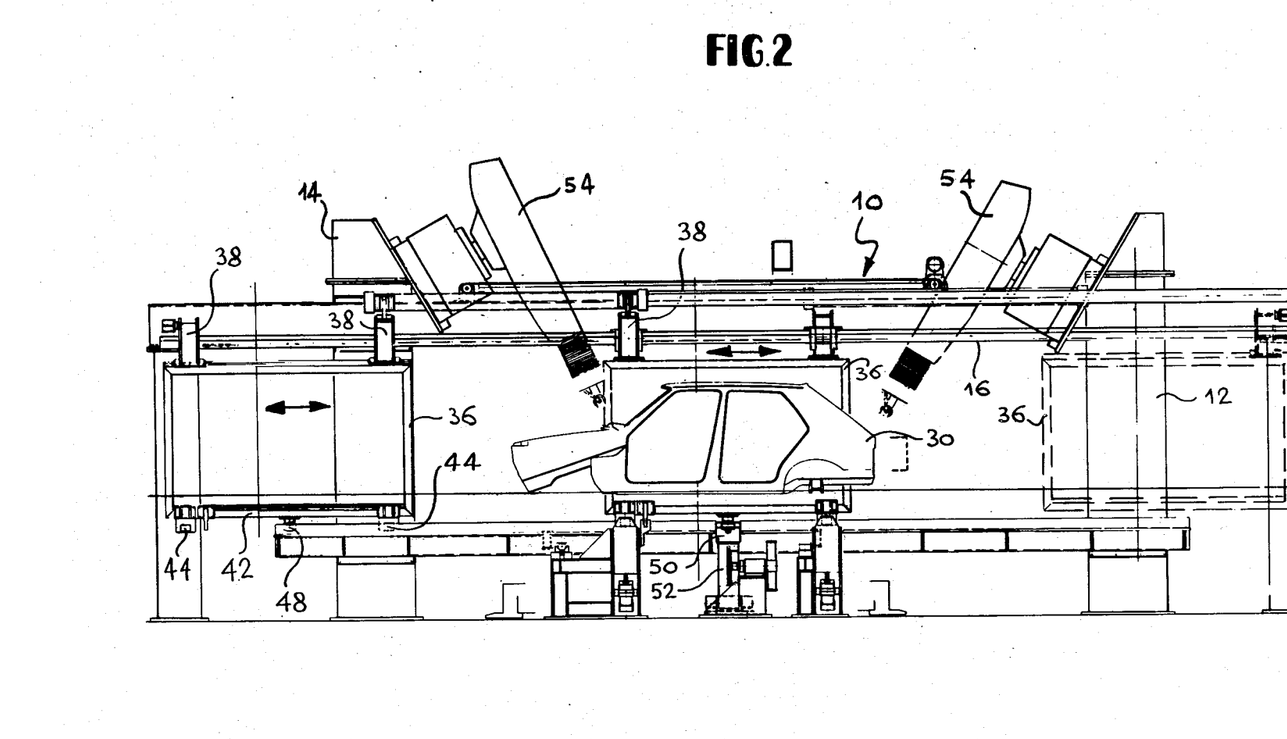
FIG. 2 is a schematic longitudinal section of the station taken along the line II—II of FIG. 1.

In FIGS. 1 and 2 a "framing" welding station 10 includes an inlet framework 12 and an outlet framework 14. In the upper corners of frameworks 12 and 14 two rails are affixed extending lengthwise across station 10. Two longitudinal lateral guides are arranged at the base of station 10 each comprising vertical shaft rollers 20 which guide a self-contained motorized transfer unit 22 having wheels 24 which are guided and controlled along a route through a "body in white" welding plant by known suitable control means.

A pallet 26 is placed by manual or suitable mechanical means on the transfer unit 22 which can be raised and lowered by means of pneumatic or hydraulic cylinders 28. The pallet 26 is provided with locating devices 27 and clamping devices 29 matching the underbody 31 of a motor vehicle body which has been loosely preassembled provisionally connecting the stamped sheet metal elements prior to being clamped on the pallet. A welding station 10 is provided with four reference seats 32 for centering the spherical self-centering projections mounted on the pallet 26.

On each side of the station 10 two side gates 36 are provided on the upper ends 38 of which are mounted rollers 40 which run on the rails 16 and permit the side gates 36 to oscillate around the axes of the rails 16 and to run lengthwise on such rails. The lower ends 42 of the side gates 36 each have two stops 44 which react to locate reference surfaces 46 of the pallet 26.

As shown in FIG. 1 the lower ends 42 of the side gates 36 are located by means of a partially spherical roller 48 into a fork 50 placed on a control lever 52, which can oscillate in the direction of the arrow "L" shown in FIG. 1 to accommodate, by means of the roller 48 and the fork 50, oscillation of the respective side gate 36 with pivotal movement about the axis of rail 16.

Each one of the two pairs of side gates 36 has clamping devices, one of which is shown at 37, adapted to hold the preassembled body in white so as to establish its final geometry. The clamping devices carried by one of the two pairs of facing side gates 36 differ from those carried by the other pair of side gates 30 so that it is possible to utilize either pair of side gates 36 for welding two different types of bodies.

Welding station 10 is fitted with programmable robots 54, each provided with a welding gun 54a to perform spot welding.

The equipment shown and described thus far operates as follows: before the transfer unit enters the welding station 10 pneumatic or hydraulic cylinders 28 lift the pallet 26 on which the preassembled body 30 is clamped. After the unit has entered the station, cylinders 28 lower the pallet 26 until its centering spheres 34 engage the self-centering locating boxes 32. At this stage the two side gates 36 which were spread open to allow for the body 30 to enter, as shown in dotted lines on the right hand side of FIG. 1, close by pivoting on rails 16 until their stops 44 react against the reference surfaces 46 of pallet 26. As a result of such rotation side gates 36 clamp the preassembled body 30 and establish its final geometry.

When the body 30 is clamped by pallet 26 and side gates 36 the welding robots 54 start to operate as programmed. Such robots 54 perform different welding cycles according to the type of body 30 placed in station 10 and the choice of the programs is made by a suitable programmable controller or process computer which may control the entire system. At the end of the welding cycle robots 54 disengage themselves and the side gates 36 are unclamped from the body and swung outwardly to an open position through levers 52. Successively the pallet 26 is lifted up and carried out of station 10 by means of powered transfer unit 22.

When a type of body 30 different from the one being processed in station 10 approaches, the control system informs a control unit of station 10 and this transfers the pair of side gates 36 as soon as its working cycle is completed replacing it with the alternate pair of side gates 36, which was in a standby position, suitable for the new type of body.

Figure 3:
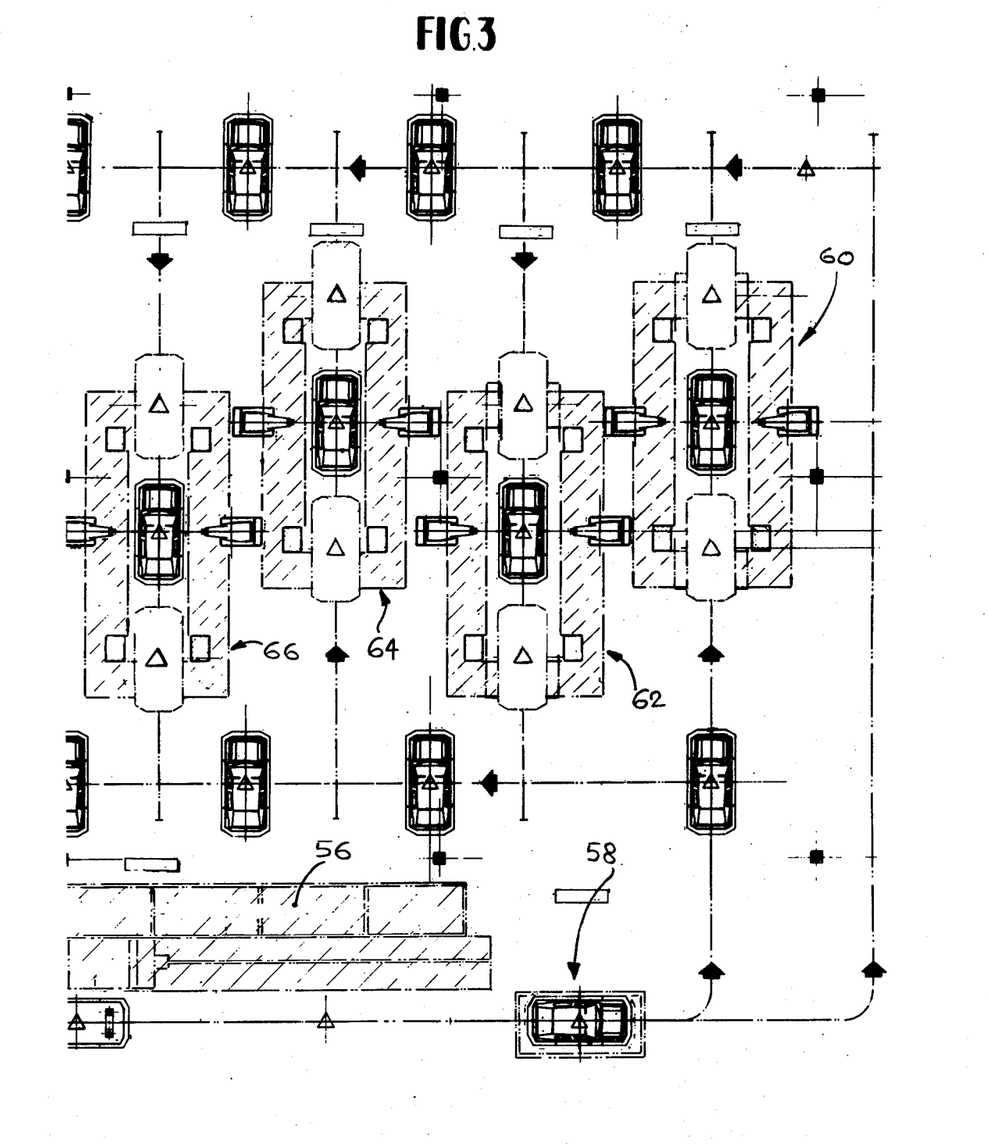
FIG. 3 is a schematic plan view of a plant provided with framing and other welding stations.

FIG. 3 shows a part of a welding plant which uses the described equipment with reference to FIGS. 1 and 2. An automatic store 56 controlled by suitable means contains pallets 26 to rigidly and accurately locate the underbody. Before entering into the loading station 58 each transfer unit 22 passes in front of the automatic store 56 where it receives the pallet equipped to receive the type of body which is arriving at the loading station.

The bodies, which are loosely preassembled in an area not shown in the drawing, arrive at the loading station 58 by means of a suitable transfer device and are loaded onto the pallet by a downstroke lift. Once the transfer has been effected the bodies are disengaged from the lift and automatically clamped to the pallet by suitable known means. The bodies are clamped on the pallet in registration with the lower body reference points and are then transferred by the powered transfer units to one of the successive stations.

If more bodies are involved in the line they can be accommodated by the two pairs of side gates at a single framing station such as shown in FIGS. 1 and 2, a plurality of framing stations may be employed in parallel, one of which is indicated at 60 in FIG. 3 together with an alternate route schematically indicating the alternative parallel stations. In the case of multiple framing stations, a selection may be made by a suitable controller which identifies the framing station corresponding to the body to be welded. Where more than one identical framing station is employed to meet production requirements, the controller may also identify either a free station or the one which is closest to the completion of its work cycle.

The framing welding operation is then performed, as in station 60, which determines the overall geometry of the finished body as previously described. The body thus geometrically defined and welded in fixed geometrical configuration is then transferred to a series of successive stations such as 62, 64 and 66, the number of which may be increased or diminished due to the flexibility of the system, for the completion welding to be performed in order to give the body its required mechanical strength.

Figures 4, 5, 6:
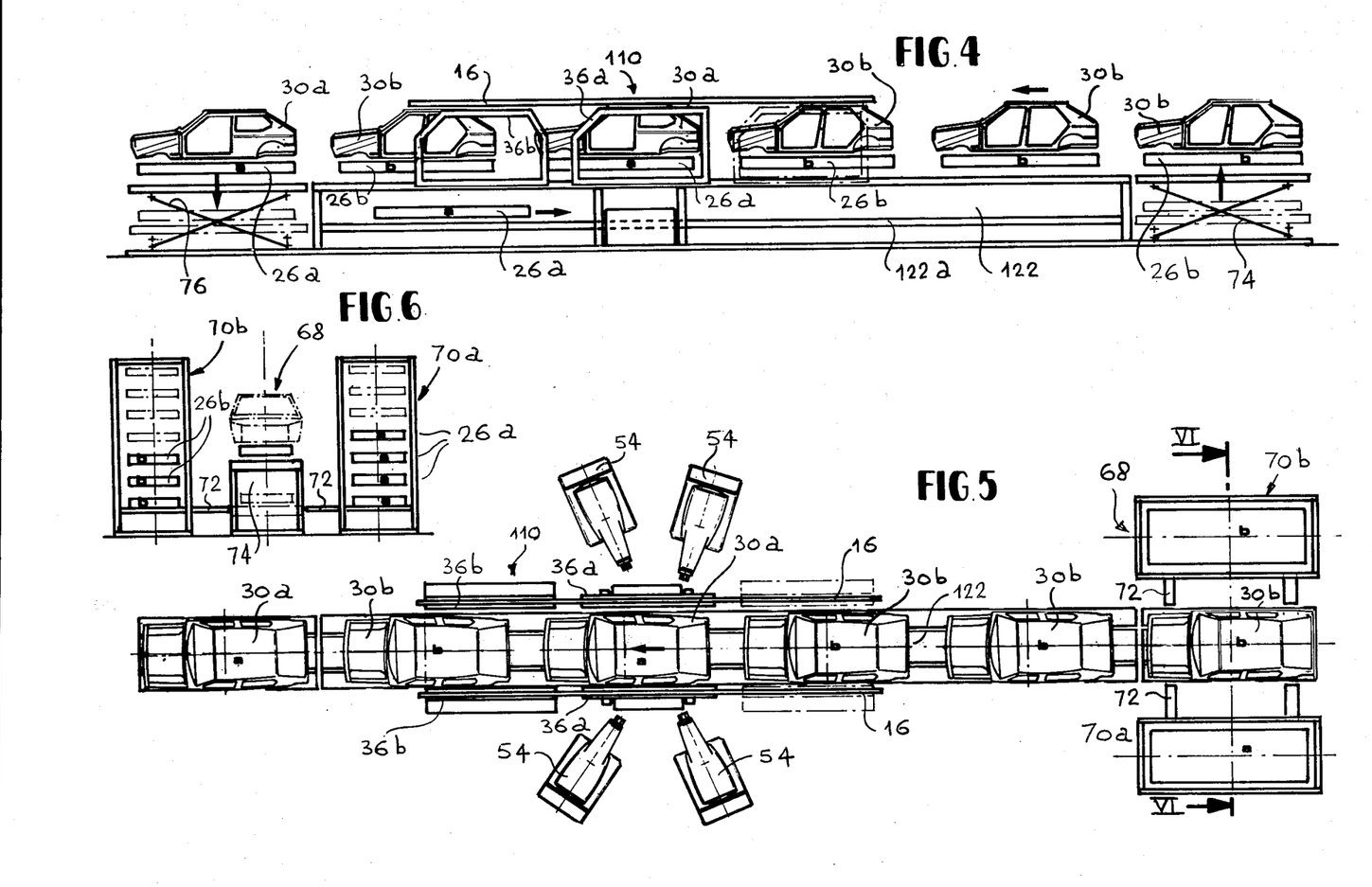
FIG. 4 shows a schematic side elevation of a modified assembly line including a variant to the construction of FIGS. 1 and 3.
FIG. 5 is a plan view of the assembly line shown in FIG. 4.
FIG. 6 is a sectional view taken along the line VI—VI of FIG. 5.

In the modified embodiment shown in FIGS. 4 to 6 two different types of bodies respectively indicated as 30a and 30b carried on correspondingly equipped pallets shown as 26a and 26b pass through a "framing" welding station 110 by means of a step-by-step transfer line already described and here indicated at 122. The station 110 is provided similarly to station 10, described with references to FIGS. 1 and 2, with two pairs of side gates 36a and 36b running lengthwise on rail 16 and pivoting on the axes of these rails. Such side gates are likewise provided with locators and clamps (not shown) to give bodies 30a carried by pallets 26a their final geometric form before they are welded by robots 54, while side gates 36b are so equipped to operate in a similar way on the bodies 36b placed on pallets 26b.

In the example shown, a body 30a carried by pallet 26a is clamped between side gates 36a while a pair of side gates 36b is in a standby position. Loading of the bodies onto the pallets is performed at station 68 which includes two vertical mechanized stores 70a and 70b for pallets placed on each side of the transfer line 122. Each store is provided with a cross transfer means, as schematically shown at 72, to feed the pallet selected by a programmable controller to an elevator 74 which brings it to the position where the corresponding preassembled body is placed. The assembly represented by the pallet and body is then inserted onto the line 122.

At the exit from the welding station 110 the pallets are separated from their respective bodies which have stably acquired their final configuration, and by means of a downstroke lifter 76 and an underneath return line 122a are transferred to the base of lifter 74 to be reinserted into their respective stores 70a and 70b in the station 68.

Figure 7:
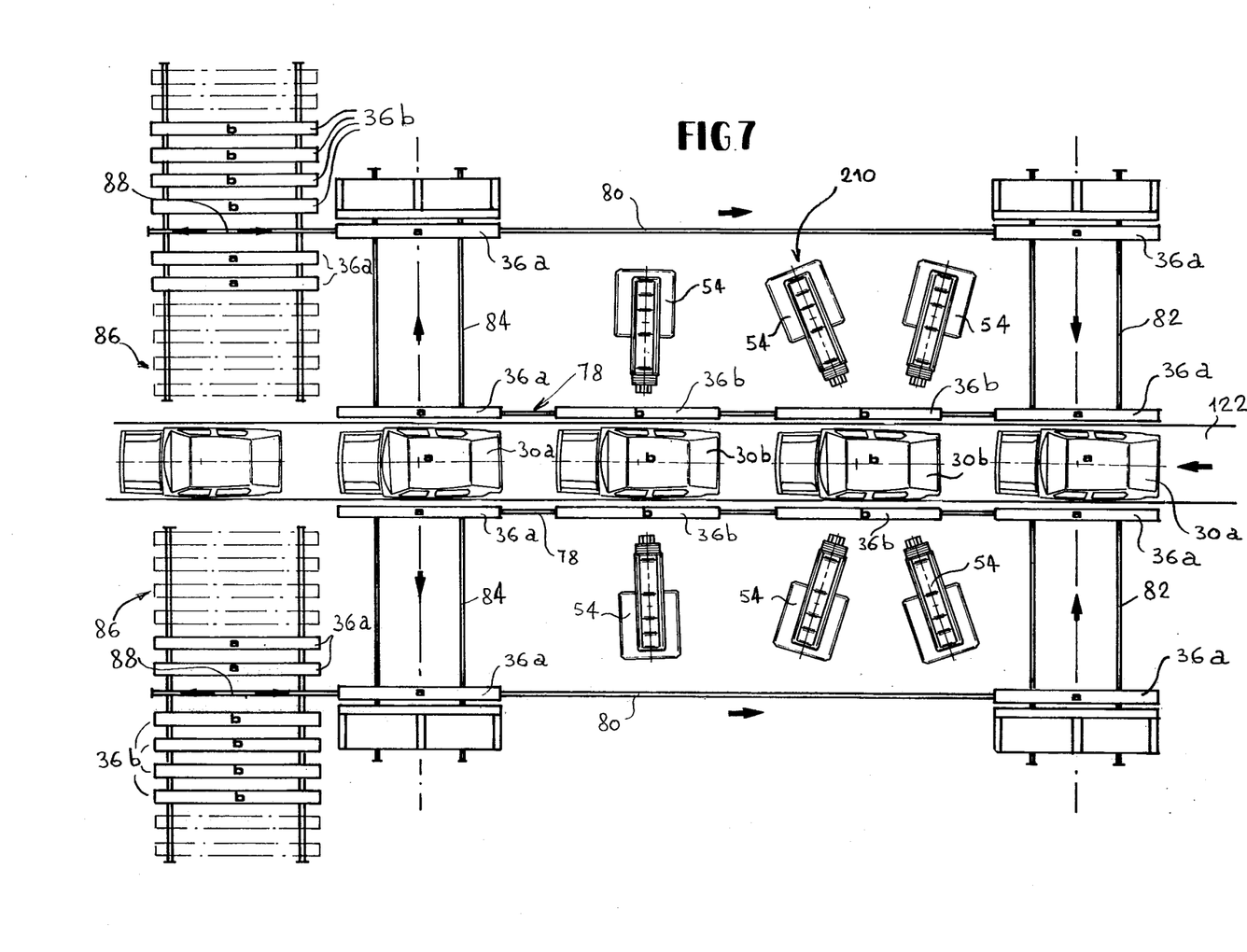
FIG. 7 is a schematic plan view of a further modified assembly line incorporating an alternative embodiment of the invention.

FIG. 7 shows schematically an alternative modification of the previously described equipment to apply the side gates against the preassembled bodies supported by relevant pallets and to replace automatically such pairs of side gates according to the type of body which reaches the welding station. Such alternative modification may be employed either in case the pallets are moved by means of self-contained transfer units, such as shown in FIGS. 1 to 3, or moved through a step-by-step transfer line as in FIGS. 4 to 6. At station 210, provided with welding robots 54, two types of bodies 30a and 30b may be accepted as shown in the example through a step-by-step transfer line 122. A circulating device for the side gates 30a and 30b is arranged on each side of station 210. Each circuit includes a forward lengthwise step-by-step branch 78 synchronized with the pallet motion; a fast return lengthwise branch 80; a transverse branch 82 before the welding station which couples the chosen side gates to the pallet carrying the relevant body; and a transverse branch 84 after the welding station to disengage the side gates from the pallet.

Two stores 86 feed the return branches 80 of the two circuits with the required pairs of side gates 36a or 36b by means of suitable transfer devices. The transfer units 88 are also used to bring back into the respective stores 86 the side gates not utilized.

Figure 8:
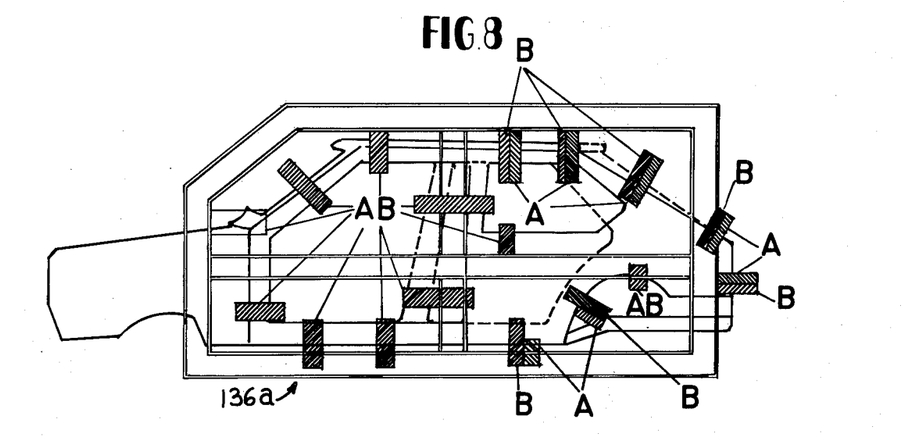
FIG. 8 is a side elevation of a side gate equipped with interchangeable locators for "two-door" and "four-door" models.
Figure 9:
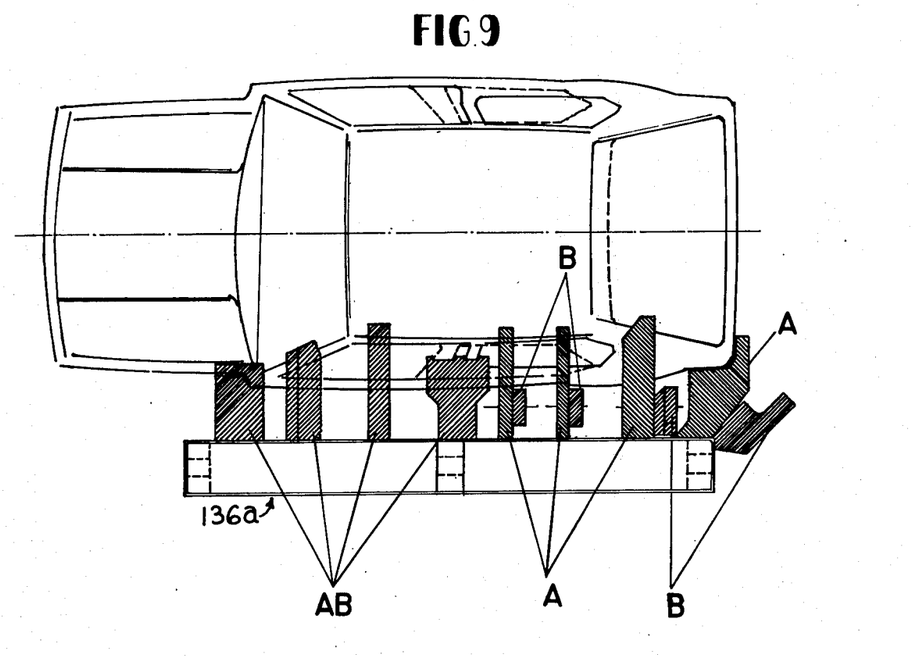
FIG. 9 is a plan view of the gate illustrated in FIG. 8.

With reference to FIGS. 8 and 9 a side gate 136a is shown equipped with locators "AB" common to both "two-door" and "four-door" models, locators "A" which may be moved in by a swivel-in mechanical device when a "two-door" model has to be assembled, and locators "B" which may be moved in by a swivel-in mechanical device when a "four-door" model is to be assembled. Locators "B" replace locators "A" which swivel-out.

Such arrangement may be employed in some cases in lieu of a second pair of reciprocating gates, as disclosed in the foregoing embodiments, or may be employed in combination with one or both pairs of such reciprocating side gates in order to accommodate three or four body styles in a single framing station. The possiblities of further multiplying the number of different body types through the use of alternative parallel framing stations as illustrating in FIG. 3 will be readily apparent in order to meet an unlimited mix of body types in a single automatic body welding system.

What is claimed is:

1. A vehicle body welding system comprising, means for accurately positioning an underbody at a main framing welding station, side gate means for accurately positioning other major components of the body relative to said underbody at said station, and means for welding said other components in fixed relation to said underbody while accurately interpositioned at said welding station, said system side gate means including interchangeable means for accuratley locating said other components of different bodies at said station; means for mounting said side gate means for movement between an open position for admitting introduction of a preliminary preassembled body and a closed position in which said side gate means clamps the body in its configuration for welding; and differently programmable means for welding said other components to match each different body at said station.

2. A system as set forth in claim 1 including transportable pallet means for accurately locating said underbody at said station.

3. A system as set forth in claim 2 including interchangeable side gate means for accurately positioning said other components of different bodies at said station.

4. A system as set forth in claim 1 including interchangeable side gate means having locating tooling adapted to laterally engage and locate each different body.

5. A system as set forth in claim 4 including reciprocable means for rapidly alternating different side gate means into operative position at said station.

6. A system as set forth in claim 1 including interchangeable different pallet means adapted to position different underbodies of different bodies.

7. A system as set forth in claim 1 including programmable robots having welding heads adapted to weld different spots as required to assemble said other components to said underbody on different bodies.

8. A system as set forth in claim 1 including successive welding stations for completing additional spot welds after the geometry of said body has been established by welding at said first welding station.

9. A system as set forth in claim 1 wherein said side gate means comprise standard main structure common to different bodies and special replaceable tooling adapting each gate to each different body.

10. A system as set forth in claim 6 including means for storing different pallets for different underbodies near a body loading station of said system in advance of said welding station, and means for introducing a matching pallet for each different underbody at said loading station.

11. A system as set forth in claim 1 including means for transporting said pallet means to and from said stations.

12. A system as set forth in claim 1 including self-propelled means for transporting said pallet to and from said station.

13. A system as set forth in claim 1 including indexing means for transporting said pallet to and from said station.

14. A system as set forth in claim 1 including means for storing different side gates for different bodies,
   means for transporting different side gates to said station in accordance with said different body requirements,
   and means for returning said side gates to storage upon completion of welding at said station.

15. A system as set forth in claim 1 including means for suspending said side gate means for lateral swinging between an inclined open position for admitting introduction of a preliminary preassembled body carried by its pallet and a substantially vertical position in which said side gate means clamps the body in its configuration for welding.

16. A system as set forth in claim 15 including rail means adapted to accommodate reciprocation of alternate gate means between standby and operative positions as well as said swinging movement of the operative side gate means into clamping position.

17. A system as set forth in claim 1 wherein said interchangeable means includes a side gate with different locators thereon adapted for different bodies.

18. A system as set forth in claim 1 wherein said interchangeable means includes a side gate with different locators thereon adapted for different bodies, said side gate also including other locators having a common position for said different bodies.

19. A system as set forth in claim 1 wherein said interchangeable means includes a side gate with interchangeable different locators thereon selectively movable to operative and inoperative positions adapted for different bodies.

20. A system as set forth in claim 1 wherein said interchangeable means includes a side gate with interchangeable different locators thereon selectively movable to operative and inoperative positions adapted for different bodies, said side gate also including other locators having a common position for said different bodies.

* * * * *